United States Patent
Bowles

(10) Patent No.: US 6,757,069 B2
(45) Date of Patent: Jun. 29, 2004

(54) LASER NON-CONTACT THICKNESS MEASUREMENT SYSTEM

(75) Inventor: Dennis Lee Bowles, Fullerton, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 454 days.

(21) Appl. No.: 09/799,181

(22) Filed: Mar. 5, 2001

(65) Prior Publication Data

US 2003/0007161 A1 Jan. 9, 2003

(51) Int. Cl.⁷ .................. G01N 21/86; G01B 11/28
(52) U.S. Cl. .................. 356/630; 250/559.27
(58) Field of Search .................. 356/630, 631, 356/632, 635, 446; 250/559.19, 559.2, 559.22, 559.23, 559.24, 559.27

(56) References Cited

U.S. PATENT DOCUMENTS

| | | | |
|---|---|---|---|
| 2,351,770 A | | 6/1944 | Koenig |
| 3,671,726 A | | 6/1972 | Kerr |
| 3,802,774 A | * | 4/1974 | Eschler et al. .............. 356/637 |
| 4,049,852 A | * | 9/1977 | Smith et al. .................. 428/55 |
| 4,705,715 A | * | 11/1987 | DeCoste et al. ............ 442/151 |
| 4,773,760 A | | 9/1988 | Makkonen |
| 5,056,922 A | * | 10/1991 | Cielo et al. .................. 356/604 |
| D326,099 S | | 5/1992 | Creech |
| 5,210,593 A | | 5/1993 | Krämer |
| 5,212,540 A | | 5/1993 | Miller |
| 5,222,729 A | * | 6/1993 | Wallaschkowski .......... 271/262 |
| 5,351,126 A | * | 9/1994 | Takada et al. .............. 356/602 |
| 5,442,573 A | * | 8/1995 | Bredberg et al. ........... 702/172 |
| 5,485,082 A | | 1/1996 | Wisspeintner et al. |
| 5,569,835 A | | 10/1996 | Kenney et al. |
| 5,581,353 A | | 12/1996 | Taylor |
| 5,617,645 A | * | 4/1997 | Wick et al. .................. 33/551 |
| 5,644,392 A | * | 7/1997 | Soest et al. .............. 356/237.1 |
| 5,661,250 A | | 8/1997 | Katahira et al. |
| 5,911,161 A | | 6/1999 | Harris |
| 6,038,028 A | | 3/2000 | Grann et al. |
| 6,094,269 A | * | 7/2000 | Ben-Dove et al. .......... 356/623 |
| 6,281,679 B1 | * | 8/2001 | King et al. .................. 324/229 |

* cited by examiner

Primary Examiner—Zandra V. Smith
Assistant Examiner—Gordon J. Stock, Jr.
(74) Attorney, Agent, or Firm—Stetina Brunda Garred & Brucker

(57) ABSTRACT

A system and a method for measuring a thickness of a workpiece. The workpiece has first and second sides, wherein the first side defines a first angular orientation. A first laser triangulation emitter/sensor may utilize an engaged first adjuster base to emit a first laser beam in generally perpendicular relation to the first angular orientation of the first side. The first laser triangulation emitter/sensor may receive a first array of diffused laser beams reflecting from the first side. There may further exist a second laser triangulation emitter/sensor sized and configured to emit a second laser beam at the second side of the workpiece. The second laser triangulation emitter/sensor may receive a second array of diffused laser beams reflecting from the second side. The first and second array of diffused laser beams may be respectively convertible into first and second signals for calculating the thickness of the workpiece.

48 Claims, 4 Drawing Sheets

LASER NON-CONTACT THICKNESS MEASUREMENT SYSTEM

STATEMENTS RE: FEDERALLY SPONSORED RESEARCH/DEVELOPMENT

This invention was made with Government support under contract N00019-96-C-0065 awarded by the United States Navy. The Government has certain rights in this invention.

CROSS-REFERENCE TO RELATED APPLICATIONS (Not Applicable)

BACKGROUND OF THE INVENTION

The present invention generally relates to a system and a method for measuring a workpiece thickness, and more particularly to an improved system and method for measuring a workpiece thickness via an adjustable laser triangulation system that is operative to emit at least one laser beam in generally perpendicular relation to angularly oriented sides of the workpiece.

The concept of measuring workpiece thicknesses in commercial and military applications is well known. More specifically, the measuring of workpiece thicknesses may have wide variety of applications in the aerospace industry, substantially extending to all forms of structural and manufacturing related operations. For instance, a workpiece thickness measurement is frequently a required engineering specification in designing and manufacturing parts related to the field, namely, in construction and assembly of structures such as aircrafts or other forms of vehicles. Simply put, the workpiece thickness measurement is often a necessary product and design information. Thus, defining workpiece thickness measurements has become a vital and integral process in the aerospace industry, as well as other related industries.

In many industries, and in the aerospace industry in particular, the workpiece thickness measurement is usually obtained by a hands-on method. Such contention is generally true in obtaining thickness measurements for workpieces such as composite laminate skins. For example, when measuring thicknesses of composite laminate skins, many aerospace industries use traditional contact inspection methods.

As is generally known, the traditional contact inspection methods require the utilization of a plurality of tools (e.g., Micrometer, Vernier Caliper, Magna Mike). Moreover, an above average skill level personnel is oftentimes needed to operate such tools in order to measure the thicknesses of composite laminate skins. In other words, a certain level of personnel expertise may be demanded when determining thicknesses of composite laminate skins via the traditional contact inspection methods. Therefore, a significant cost associated with training the personnel may be unavoidable, as well as the time expended therewith.

However, even when the traditional contact inspection methods are applied correctly, such methods are marred by unfavorable limitations. For instance, the speed and accuracy of measuring the thicknesses of composite laminate skins are frequently compromised, as manual interaction plays a considerable role and is often inevitable. Furthermore, the tools utilized in the traditional contact inspection methods, such as the Micrometer and the Vernier Caliper, may generally be restricted to measuring static workpieces. As a result, such methods have posed to be moderately ineffective and inconvenient in the aerospace industry.

Many industries, not necessarily related to the aerospace industry, have begun using laser triangulation systems to measure thicknesses of desired workpieces. More specifically, the laser triangulation system may comprise two opposing laser heads, wherein a specific workpiece may be positioned therebetween. Thereafter, a laser beam may be radiated from each respective opposing laser heads on the surfaces of the workpiece. In addition, the opposing laser heads may further receive the laser beams which are reflected from the surfaces of the workpiece. The laser triangulation system may convert the laser beams into a computable signal for conveyance to a measurement device (i.e., a computer). Thus, the measurement device may then manifest the computable signal into a workpiece thickness measurement.

However, the laser triangulation systems have their disadvantages. In particular, it is imperative that the laser beams radiated from the laser heads be perpendicular to the surfaces of the workpiece. If they are not perpendicular to the workpiece surfaces, then the precision and accuracy of the thickness measurements may be substantially reduced. Moreover, both of the laser beams should be aimed at a common axis of the workpiece such that the precision and accuracy of the thickness measurements remain intact.

Continuing the above paragraph, the general preference to have the laser beams in perpendicular relation to the workpiece surfaces, while the laser beams are aimed at the common axis thereof, may be for the purposes of procuring the appropriate angles and depth. More specifically, acquiring the proper degrees of separation between the radiated laser beams and the reflected laser beams may be essential in the overall calculation of the workpiece thickness. Additionally, it may further be important that the laser beams share the common axis of the workpiece so that a measurement can be made as to the particular thickness of that axis.

The laser triangulation systems have generally been used to measure thicknesses of flat surfaced workpieces in the industries that they are most utilized in. Because of the flatness of the workpiece surfaces, a perpendicular relationship therewith may easily be achieved by the radiated laser beams. Moreover, the common axis of the workpiece may further be shared by the laser beams thereby. However, in certain industries, such as the aerospace industry in particular, the workpieces often do not possess flat surfaces. The aerospace industry usually involves construction and assembly of complex structures due to the inherent nature of its business. The workpieces involved in the aerospace industry may define sophisticated configurations and angular orientations. Application of the laser triangulation methods as described above may be difficult, and sometimes impractical. In order to obtain the desired perpendicular relationship and the common axis between the laser beams and the workpiece, the workpiece may need to be conformed to the laser triangulation system. Such tempering of the workpiece may result in incorrect measurement of its thickness.

Thus, there has long been a need in the industry, and in the aerospace industry in particular, for a uniform system and method of measuring workpiece thicknesses in a more efficient and accurate manner without involving highly skilled personnel. In particular, there is a need to apply such system and method to measure thicknesses of workpieces that define sophisticated configurations and angular orientations.

The present invention addresses the above-described deficiencies by introducing a system and a method to the aerospace industry in particular to avoid the traditional contact inspection methods when measuring workpiece thicknesses by utilizing a laser non-contact thickness measurement system. More specifically, the laser non-contact thickness measurement system is designed to conform to a plurality of workpiece configurations and angular orientations so as to facilitate the emission of laser beams in generally perpendicular relation thereto. In this respect, not only does the present invention mitigate the problems posed by the traditional contact inspection methods used in the aerospace industry, but it also corresponds to various workpiece configurations and angular orientations as well.

BRIEF SUMMARY OF THE INVENTION

In accordance with a preferred embodiment of the present invention, there is provided a system and a method for measuring a thickness of a workpiece having first and second sides, wherein the second side may define a reference plane. The first side has a first angular orientation with respect to the reference plane. The reference plane may further define a target axis which extends perpendicular from a second side target point of the second side disposed in the reference plane through a first side target point of the first side.

A first laser triangulation emitter/sensor may be sized and configured to emit a first laser beam at the first side target point. More specifically, the first laser triangulation emitter/sensor may comprise a first laser diode for the purpose of emitting the first laser beam at the first side target point. The first laser triangulation emitter/sensor may further be receivable of a first array of diffused laser beams reflecting from the first side target point via a first lens and a first detector thereof. The first array of diffused laser beams may be reflectable from the first side target point to the first lens so as to focus upon the first detector therefrom.

The first detector may receive the first array of diffused laser beams from the first lens, wherein the first array of diffused laser beams may include a brightest diffused laser beam disposed therein. More particularly, the first detector may be operative to selectively detect the brightest diffused laser beam to generate a first signal in response to such detection.

In the preferred embodiment, there is further provided a first adjuster base engaged to the first laser triangulation emitter/sensor. The first adjuster base may be operative to adjust the first laser triangulation emitter/sensor to emit the first laser beam in generally perpendicular relation to the first angular orientation of the first side. Specifically, a first support column may be pivotally engaged to the first adjuster base. The first support column is engaged opposite the first laser triangulation emitter/sensor so as to position the first adjuster base therebetween. The first adjuster base may be pivotally movable with respect to the reference plane for facilitating adjustment of the first laser triangulation emitter/sensor. Moreover, a first support base may be removably engaged to the first support column, wherein the first support base is engaged opposite the first adjuster base so as to position the first support column therebetween. Thus, the first support column may be vertically adjustable, or movable, with respect to the reference plane for accommodating different thicknesses of the workpiece.

In addition, a second laser triangulation emitter/sensor may be sized and configured to emit a second laser beam at the second side target point. More specifically, the second laser triangulation emitter/sensor may comprise a second laser diode for the purpose of emitting the second laser beam at the second side target point. The workpiece may be placed between the first laser triangulation emitter/sensor and the second laser triangulation emitter/sensor. The workpiece may be a composite laminate skin.

In accordance with a preferred embodiment of the present invention, the second laser triangulation emitter/sensor may be receivable of a second array of diffused laser beams reflecting from the second side target point via a second lens and a second detector thereof. The second array of diffused laser beams may be reflectable from the second side target point to the second lens so as to focus upon the second detector therefrom.

The second detector may receive the second array of diffused laser beams from the second lens, wherein the second array of diffused laser beams may include a brightest diffused laser beam disposed therein. More particularly, the second detector may be operative to selectively detect the brightest diffused laser beam to generate a second signal in response to such detection.

Moreover, a second adjuster base may be engaged to the second laser triangulation emitter/sensor. The second side of the workpiece may further define a second angular orientation. The second adjuster base may be operative to adjust the second laser triangulation emitter/sensor to emit the second laser beam in generally perpendicular relation to the second angular orientation of the second side. Specifically, a second support column may be pivotally engaged to the second adjuster base. The second support column is engaged opposite the second laser triangulation emitter/sensor so as to position the second adjuster base therebetween. The second adjuster base may be pivotally movable with respect to the reference plane for facilitating adjustment of the second laser triangulation emitter/sensor. Moreover, a second support base may be removably engaged to the second support column, wherein the second support base is engaged opposite the second adjuster base so as to position the second support column therebetween. Thus, the second support column may be vertically adjustable, or movable, with respect to the reference plane for accommodating different thicknesses of the workpiece.

In the preferred embodiment, the first and second array of diffused laser beams may be respectively convertible into first and second signals for calculating the thickness of the workpiece along the target axis. More specifically, the first and second signals are respectively first and second electrical output signals. The first electrical output signal may be representative of a first distance between the first laser triangulation emitter/sensor and the first side of the workpiece. The second electrical output signal may be representative of a second distance between the second laser triangulation emitter/sensor and the second side of the workpiece.

Furthermore, the first and second distances may be respectively proportional to first and second angles. The first angle may be indicative of a degree of separation between the emitted first laser beam and the reflected first array of diffused laser beams. The second angle may be indicative of a degree of separation between the emitted second laser beam and the reflected second array of diffused laser beams. There may further comprise a measurement computer. The first and second electrical output signals may be transmittable to the measurement computer for calculating the thickness of the workpiece along the target axis.

Moreover, the workpiece may be maneuverable between the first and second laser triangulation emitters/sensors when they are stationary. More specifically, the first and second sides of the workpiece respectively define a plurality of corresponding first and second side target points. The first and second laser triangulation emitters/sensors may be operative to continuously emit the first and second laser beams at any of the plurality of corresponding first and second side target points.

In response, the first and second laser triangulation emitters/sensors receive the respective first and second array of diffused laser beams therefrom for measuring the thickness of the workpiece along each of the target axes defined thereby. The first and second array of diffused laser beams are continuously convertible into respective first and second electrical output signals as the workpiece maneuvers between the first and second laser triangulation emitters/sensors. Similar to above, the first and second electrical output signals are transmitted to the measurement computer to calculate the thickness of the workpiece along the respective target axes.

In particular, the workpiece has peripheral edges. The workpiece may be maneuvered such that none of the emitted first and second laser beams extend beyond the peripheral edges of the workpiece. In addition, the workpiece may be maneuverable in x, y, z and Θ axes with respect to the reference plane. More particularly, the workpiece may be laterally movable with respect to the reference plane along a x axis. The workpiece may be longitudinally movable with respect to the reference plane along a y axis. Furthermore, the workpiece may be vertically and rotationally movable with respect to the reference plane along a z and Θ axes, respectively.

The workpiece may define a configuration. The thickness of the configuration may be measured via emitting the first and second laser beams thereto when the workpiece is maneuvered between the first and second laser triangulation emitters/sensors. The configuration may be a pyramidal configuration that is defined in an intermediate area of the workpiece.

BRIEF DESCRIPTION OF THE DRAWINGS

These as well as other features of the present invention, will become more apparent upon reference to the drawings wherein.

DETAILED DESCRIPTION OF THE INVENTION

Figure 1:
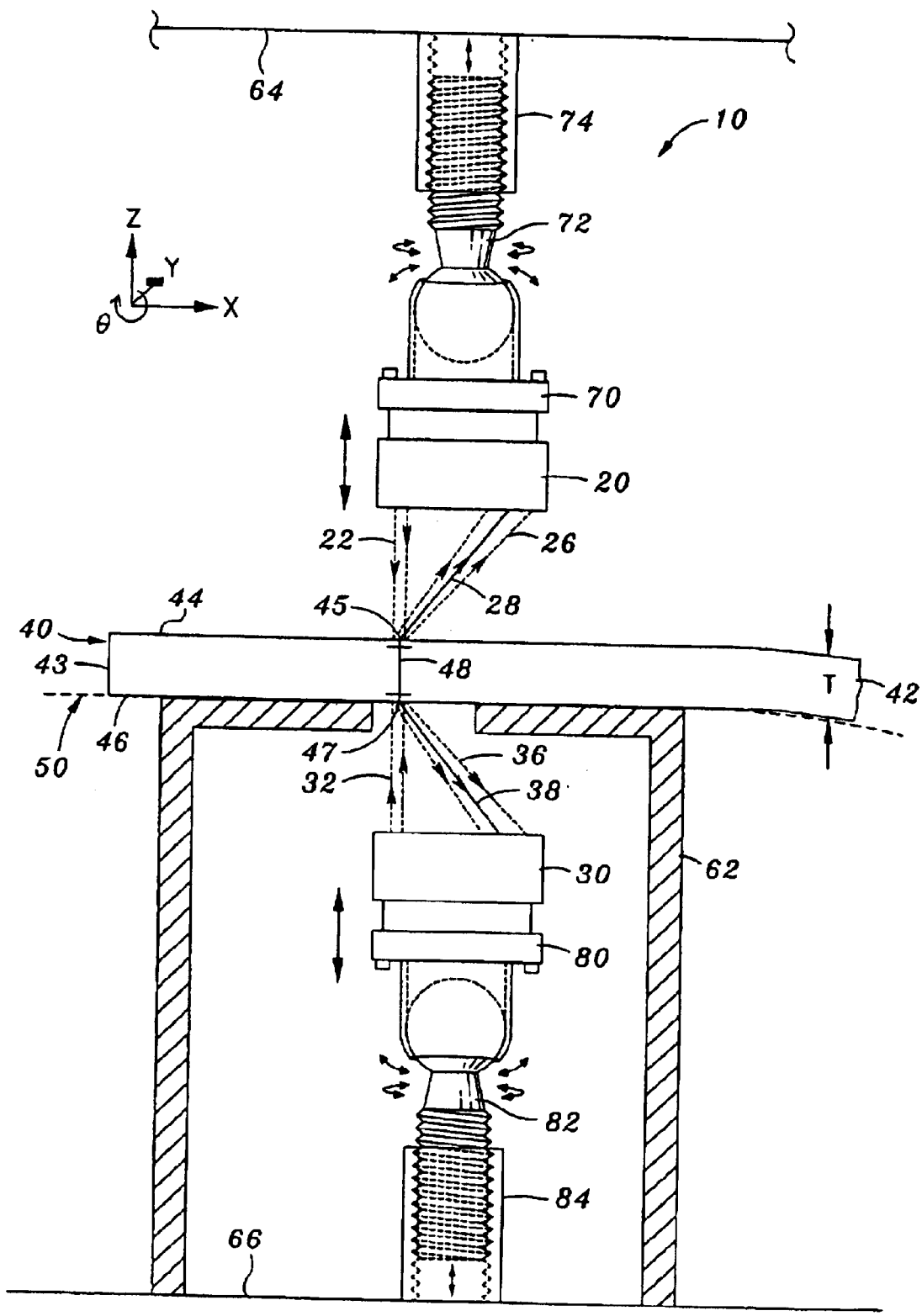
FIG. 1 is a front view of a laser non-contact thickness measurement system constructed in accordance with the present invention, further illustrating laser triangulation emitters/sensors thereof for measuring a workpiece thickness.

Referring now to the drawings wherein the showings are for purposes of illustrating preferred embodiments of the present invention only, and not for purposes of limiting the same, FIG. 1 is a frontal view of a laser non-contact thickness measurement system 10 constructed in accordance with the present invention. The laser non-contact thickness measurement system 10 is adapted to engage a first laser triangulation emitter/sensor 20 and a second laser triangulation emitter/sensor 30. In this regard, the laser non-contact thickness measurement system 10 may be formed to have a variety of shapes, configuration, and geometries for engaging the first and second laser triangulation emitters/sensors 20, 30 thereto. It will be contemplated by those of ordinary skill in the art that such laser measurement system 10 may be fabricated from different types of material, such as metal for example.

Figure 2:
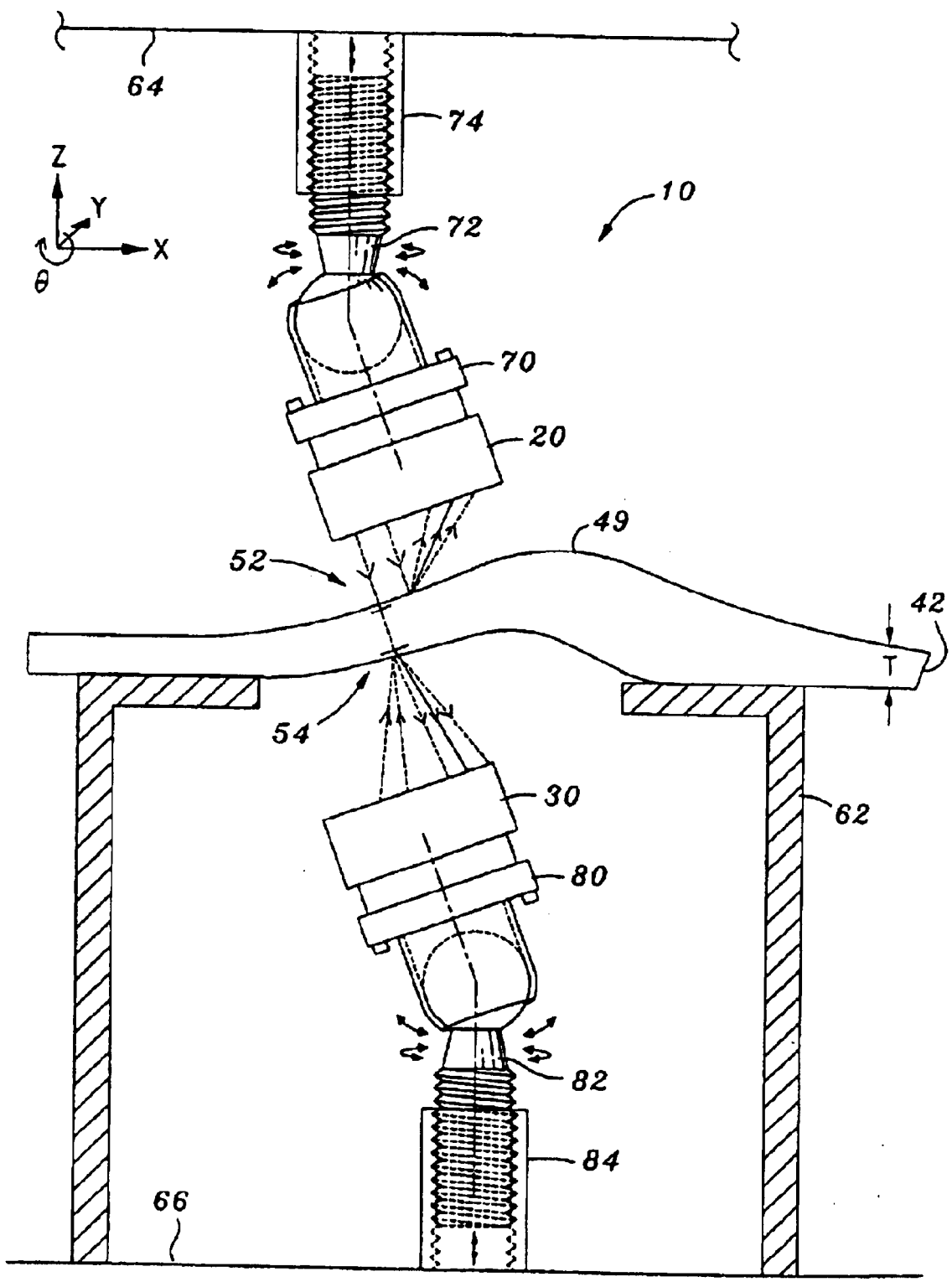
FIG. 2 is a front view of the laser non-contact thickness measurement system of FIG. 1 utilizing adjuster bases for emitting laser beams from the laser triangulation emitters/sensors in generally perpendicular relation to workpiece sides.

Referring more particularly to FIGS. 1 and 2, as the laser non-contact thickness measurement system 10 may be any general shape, it is understood that the laser measurement system 10 as depicted is symbolic in nature, and it is the concept of utilizing such system 10 for measuring a thickness 42 of a workpiece 40 that should be appreciated. Moreover, the workpiece 40 may be any general workpiece presented in the aerospace industry, such as a composite laminate skin for instance.

More specifically, the thickness 42 of the workpiece 40 (e.g., the composite laminate skin) may be measured via the utilization of the laser non-contact thickness measurement system 10. The workpiece 40 has a first side 44 and a second side 46. The first and second sides 44, 46 of the workpiece 40 may have a plurality of corresponding first side target points 45 and second side target points 47. Furthermore, the second side 46 may determine a reference plane 50. In view of the reference plane 50, each of the corresponding first and second side target points 45, 47 may define a target axis 48. In particular, the target axis 48 may extend perpendicular from the respective second side target point 47 of the second side 46 disposed in the reference plane 50 through the corresponding first side target point 45 of the first side 44.

Moreover, the laser non-contact thickness measurement system 10 comprises the first and second laser triangulation emitters/sensors 20, 30 designed to measure the thickness 42 of the workpiece 40. As will be discussed below, the workpiece 40 may be placed upon a workpiece holder 62 of a supporting fixture 60 (see FIGS. 3 through 5) to be positioned between the first and second laser triangulation emitters/sensors 20, 30. When the workpiece 40 is positioned in such manner, the first laser triangulation emitter/sensor 20 is configured to emit a first laser beam 22 at the workpiece 40, namely, the first side target point 45.

In addition, the second laser triangulation emitter/sensor 30 may also emit a second laser beam 32 at the workpiece 40, namely, the second side target point 47. In this regard, it should be noted that the first and second side target points 45, 47 are determined to be where the first and second laser beams 22, 32 are respectively emitted at the first and second sides 44, 46 of the workpiece 40. Simply put, the first and second side target points 45, 47 may be numerous and further vary depending on the emission of the first and second laser beams 22, 32 upon the respective ones of the first and second sides 44, 46 of the workpiece 40. Moreover, the wavelength of the first and second laser beams is preferably about 670 nm, whereas the diameter thereof is preferably about 70 $\mu$m.

The laser non-contact thickness measurement system 10 may further comprise a first adjuster base 70 and a second adjuster base 80. More particularly, the first adjuster base 70 may be engaged to the first laser triangulation emitter/sensor 20, whereas the second adjuster base 80 may be engaged to the second laser triangulation emitter/sensor 30. The first and second adjuster bases 70, 80 may be permanently fixed to their respective laser triangulation emitters/sensors 20, 30. In the alternative, the first and second adjuster bases 70, 80 may be removably attachable to their respective laser triangulation emitters/sensors 20, 30. For example, the adjuster bases 70, 80 may be fastened to the laser triangulation emitters/sensors 20, 30 by any means such as by screws, rivets, drilling pins, bolts or the like.

The purpose of the first and second adjuster bases 70, 80 is to adjust the first and second laser triangulation emitters/sensors 20, 30 in relation to the first and second sides 44, 46 of the workpiece 40. In particular, the first adjuster base 70 may be operative to move the first triangulation emitter/sensor 20, which is attached thereto, so as to emit the first laser beam 22 in generally perpendicular relation to the first side 44 of the workpiece 40. In other words, the relationship between the emitted first laser beam 22 and the first side 44 of the workpiece 40 should be one that of general perpendicularity. By the same token, the second adjuster base 80 may also be operative to adjust the second laser triangulation emitter/sensor 30 so as to emit the second laser beam 32 in generally perpendicular relation to the second side 46 of the workpiece 40.

However, the workpiece 40 often defines a variety of angular orientations. More specifically, the first side 44 of the workpiece 40 may be defined by an angular orientation, namely, a first angular orientation 52. It should be noted that the first side 44 may be defined by a number of different types of first angular orientations 52. Irrespective of the type of the first angular orientation 52, the first adjuster base 70 is configured to adjust the attached first laser triangulation emitter/sensor 20 such that the first emitter/sensor 20 may emit the first laser beam 22 in generally perpendicular relation to the first angular orientation 52 defined by the first side 44. Simply put, the first adjuster base 70 may be sized and configured to move the first laser triangulation emitter/sensor 20 so that the first laser beam 22 emitted therefrom may form a general perpendicular relationship with the first angular orientation 52 of the first side 44.

Furthermore, the second side 46 of the workpiece 40 may also define an angular orientation, namely, a second angular orientation 54. Similar to the first side 44, the second side 46 may have different types of second angular orientations 54. Irrespective of the type of the second angular orientation 54, the second adjuster base 80 is adapted to adjust the attached second laser triangulation emitter/sensor 30 such that the second emitter/sensor 30 may emit the second laser beam 32 in generally perpendicular relation to the second angular orientation 54 of the second side 46. Simply put, the second adjuster base 80 may move the second laser triangulation emitter/sensor 30 so that the second laser beam 32 emitted therefrom may form a general perpendicular relationship with the second angular orientation 54 of the second side 46.

In addition, the first and second side target points 45, 47 of the workpiece 40 may be disposed in the target axis 48. More particularly, the first and second laser beams 22, 32 should be emitted at each respective ones of the target points 45, 47 which are placed in the target axis 48. In other words, it is recommended that the first and second laser beams 22, 32 are emitted at the respective target points 45, 47 which share the same target axis 48. In this way, the first and second laser beams 22, 32 may concentrate on the target axis 48 of the workpiece 40, in which the distance of the target axis 48 between the first and second side target points 45, 47 may be representative of the workpiece thickness 42. As one of ordinary skill in the art of laser triangulation system technology may be aware, if the first and second laser beams 22, 32 are not perpendicular to the workpiece sides 44, 46, and/or share the same target axis 48 in a collinear fashion, the measurement of the workpiece thickness 42 may be compromised.

As already mentioned, the first and second adjuster bases 70, 80 are operative to adjust their respectively engaged laser triangulation emitters/sensors 20, 30 in order to ensure that the first and second laser beams 22, 32 are emitted generally perpendicular to the workpiece 40, and further share the target axis 48.

In view of the reference plane 50 to describe the movement of the first and second adjuster bases 70, 80 in detail, a first support column 72 may be pivotally engaged to the first adjuster base 70, whereas a second support column 82 may be pivotally engaged to the second adjuster base 80. Such respective pivot engagements may be accomplished via any conventional manner (e.g., pivot ball, pivot pin, coupling, etc.). The first support column 72 is engaged opposite the first laser triangulation emitter/sensor 20 so as to position the first adjuster base 70 therebetween. In the same fashion, the second support column 82 is engaged opposite the second laser triangulation emitter/sensor 30 so as to position the second adjuster base 80 therebetween. In this respect, the first and second adjuster bases 70, 80 may be pivotally movable with respect to the reference plane 50 for facilitating adjustments of the first and second laser triangulation emitters/sensors 20, 30.

Moreover, a first support base 74 may be removably engaged to the first support column 72, wherein the first support base 74 is engaged opposite the first adjuster base 70 so as to position the first support column 72 therebetween. Also, a second support base 84 may be removably engaged to the second support column 82, wherein the second support base 84 is engaged opposite the second adjuster base 80 so as to position the second support column 82 therebetween. The first and second support columns 72, 82 may be preferably threaded as to be complimentary to apertures respectively defined in the first and second support bases 74, 84. Thus, the first and second support columns 72, 82 may be respectively movable from the first and second support bases 74, 84 so as to be vertically adjustable with respect to the reference plane 50 for accommodating different thicknesses 42 of the workpiece 40.

The movements/adjustments of the first and second adjuster bases 70, 80 may be done manually, or controlled by any conventional controlling mechanisms. One mechanism that may be utilized to control the movement of the adjuster bases 70, 80 may be a measurement computer 90 (see FIG. 6), which may also be used to calculate the thickness 42 of the workpiece 40 along the target axis 48. Moreover, it will be contemplated by those of ordinary skill in the art that the first and second adjuster bases 70, 80 may each comprise a motor for effecting movements thereof, in which such motors may further be in communication with the conventional controlling mechanisms for transmitting movement data thereto by a user. However, it should be noted that there are other ways, whether conventional or creative, for controlling the movements of the adjuster bases 70, 80 and the depiction just described above should serve to portray only one of such ways.

Figure 6:
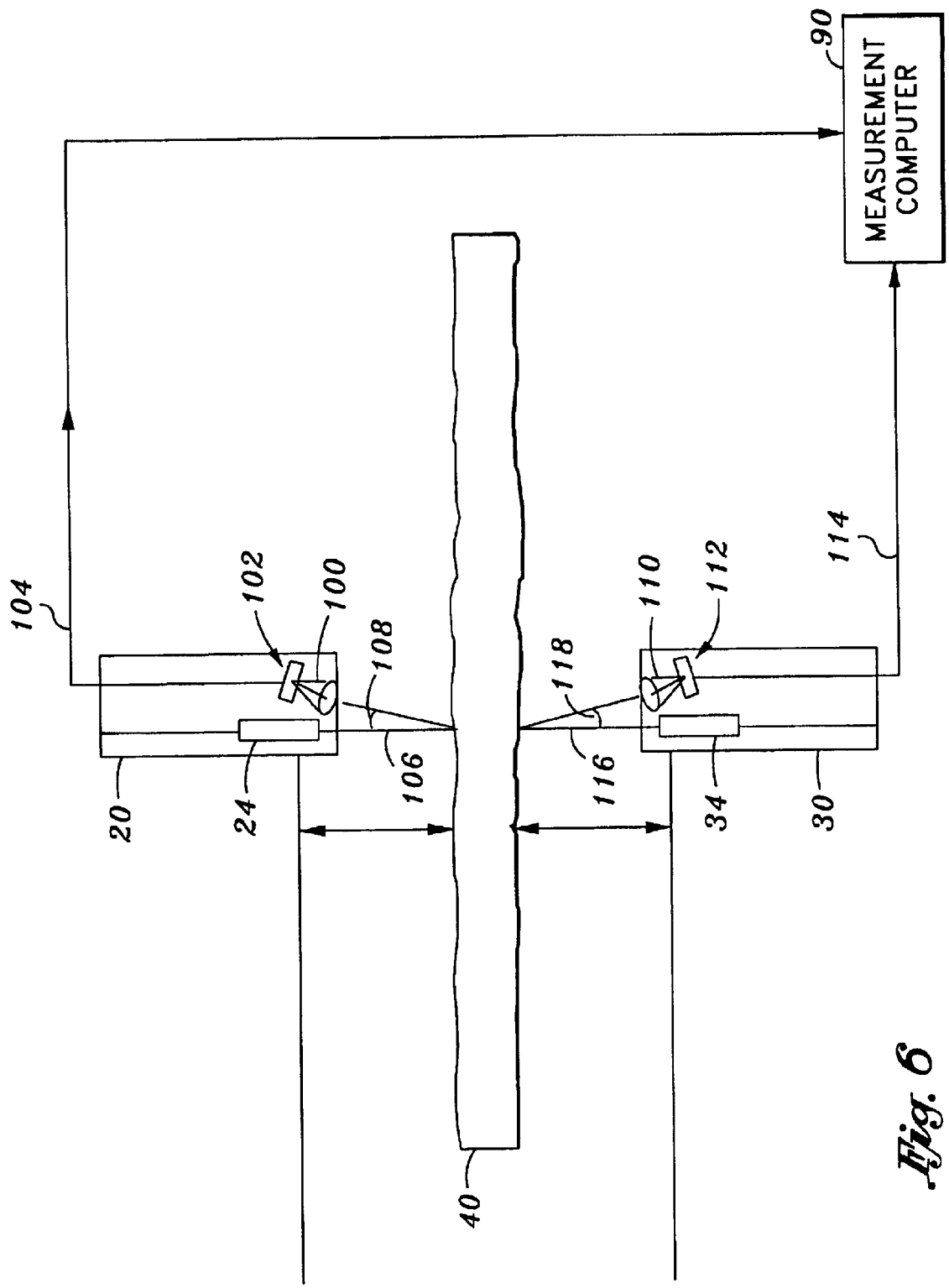
FIG. 6 is a schematic view of the laser non-contact thickness measurement system of FIG. 1 specifically illustrating the emission and reception of the laser beams via the laser triangulation emitters/sensors in relation to the workpiece sides.

Referring now to FIGS. 1, 2 and 6, subsequent to the emission of the first and second laser beams 22, 32, such beams 22, 32 may be reflected back to the first and second laser triangulation emitters/sensors 20, 30, respectively. More specifically, the first laser beam 22 may be emitted from a first diode 24 of the first laser triangulation emitter/sensor 20, whereas the second laser beam 32 may also be emitted from a second diode 34 of the second laser triangulation emitter/sensor 30. Such diodes 24, 34 may already be available for the task of accomplishing beam emissions. For example, it is known in the art that the Keyence Model 081 uses such diodes 24, 34 and may be consistent with some of the disclosures of the present invention as stated herein. Like Keyence Model 081, the first and second diodes 24, 34 are preferred to be triangulation style Class II 0.95 mw red semiconductor light source laser heads. After emission to the respective target points 45, 47, the first and second laser beams 22, 32 may reflect therefrom for transmittance back to their respective laser triangulation emitters/sensors 20, 30.

Moreover, the workpiece 40 may be maneuverable between the first and second laser triangulation emitters/sensors 20, 30 when they are in a stationary position. In other words, the workpiece 40 itself may be maneuverable between the first and second laser triangulation emitters/sensors 20, 30. By doing so, the first and second laser triangulation emitters/sensors 20, 30 may measure the thickness 42 of different areas of the workpiece 40 as the workpiece 40 moves therebetween. As already stated above, the first and second sides 44, 46 of the workpiece 40 may respectively define a plurality of corresponding first and second side target points 45, 47.

More specifically, as the workpiece 40 moves, the first and second laser triangulation emitters/sensors 20, 30 may be operative to continuously emit the first and second laser beams 22, 32 at any of the plurality of corresponding first and second side target points 45, 47. The workpiece 40 may be manually maneuvered at will by an operator, for example. Or, in the alternative, the workpiece 40 may be systematically maneuverable via a machine. Either way, the thickness 42 of different areas of the workpiece 40 may be measured as it is maneuvered in relation to the first and second laser triangulation emitters/sensors 20, 30.

In response, the first and second laser triangulation emitters/sensors 20, 30 may receive the respective first and second array of diffused laser beams 26, 36 therefrom for measuring the thickness 42 of the workpiece 40 along each of the target axes defined thereby 48. Upon receipt thereof, the first and second array of diffused laser beams 26, 36 are continuously convertable into respective first and second electrical output signals as the workpiece 40 maneuvers between the first and second laser triangulation emitters/sensors 20, 30, as will be better discussed below. As will also be discussed better below, the first and second electrical output signals are transmitted to a measurement computer 90 (see FIG. 6) to calculate the thickness 42 of the workpiece 40 along the respective target axes 48. In particular, the workpiece 40 has peripheral edges 43. More particularly, the workpiece 40 may be maneuvered in such a way that none of the emitted first and second laser beams 22, 32 may extend beyond the peripheral edges 42 of the workpiece 40. In addition, the workpiece 40 may be maneuverable in x, y, z and Θ axes with respect to the reference plane 50. More specifically, the workpiece 40 may be moved laterally with respect to the reference plane 50 along the x axis. Moreover, the workpiece 40 may further be moved longitudinally with respect to the reference plane 50 along the y axis. In addition, the workpiece 40 may also be maneuvered vertically with respect to the reference plane 50 along the z axis.

Lastly, the workpiece 40 may move in a rotational motion with respect to the reference plane 50 along the Θ axis. Therefore, the workpiece 40, when combining the various movements as just described, may be suited to yield a plurality of movements between the first and second laser triangulation emitters/sensors 20, 30 for the purpose of measuring the different areas thereof.

The workpiece 40 may define a configuration 49. The thickness 42 of the configuration 49 may be measured via emitting the first and second laser beams 22, 32 thereto when the workpiece is maneuvered between the first and second laser triangulation emitters/sensors 20, 30. More particularly, the first and second laser triangulation emitters/sensors 20, 30 may measure the thickness 42 of the workpiece 40, including the configuration thereof. The configuration 49 may be a pyramidal configuration, for example, that is defined in an intermediate area of the workpiece 40.

Concentrating now on the first laser triangulation emitter/sensor 20, the first laser beam 22 may bounce off the first side target point 45 located in the target axis 48 to the first laser triangulation emitter/sensor 20. The first laser triangulation emitter/sensor 20 may further comprise a first lens 100 and a first detector 102. When the first laser beam 22 reflects off the workpiece 40, the first laser beam 22 may go back to the first laser triangulation emitter/sensor 20 in the form of an array of diffused laser beams, namely, a first array of diffused laser beams 26. Specifically, the first array of diffused laser beams 26 may transmit back to the first lens 100. The first lens 100 may be operative to focus such laser beams 26 upon the first detector 102. Thereafter, the first detector 102 may operate to detect a brightest diffused laser beam 28 disposed in the first array of diffused laser beams 26. In response to the detection of the brightest diffused laser beam 28, the first detector 102 may facilitate in converting such diffused laser beam 26 so as to generate a first signal 104.

Similar to the above, the second laser beam 32 may reflect off the second side target point 47 also located in the target axis 48 to the second laser triangulation emitter/sensor 30. The second laser triangulation emitter/sensor 30 may comprise a second lens 110 and a second detector 112. When the second laser beam 32 reflects off the workpiece 40, the second laser beam 32 may communicate back to the second laser triangulation emitter/sensor 30 as a second array of diffused laser beams 36. The second array of diffused laser beams 36 may transmit back to the second lens 110. The second lens 110 may further be operative to focus such laser beams 36 upon the second detector 112. Moreover, the second detector 112 may operate to detect a brightest diffused laser beam 38 disposed in the second array of diffused laser beams 36. In response to the detection of the brightest diffused laser beam 38, the second detector 112 may facilitate in converting such diffused laser beam 36 so as to generate a second signal 114.

The first signal 104 may be a form of an electrical output signal, namely, a first electrical output signal. More specifically, the first electrical output signal may be representative of a distance, namely, a first distance 106, between the first laser triangulation emitter/sensor 20 and the first side 44 of the workpiece 40. The first distance 106 may be proportional to a first angle 108, where the first angle 108 may be indicative of a degree of separation between the emitted first laser beam 22 and the reflected first array of diffused laser beams 26.

The second signal 114 may also be a form of an electrical output signal, namely, a second electrical output signal. In particular, the second electrical output signal may be representative of a distance, namely, a second distance 116, between the second laser triangulation emitter/sensor 30 and the second side 46 of the workpiece 40. The second distance 116 may be proportional to a second angle 118, where the second angle 118 may be indicative of a degree of separation between the emitted second laser beam 32 and the reflected second array of diffused laser beams 36.

The first and second electrical output signals may be transmittable to a measuring mechanism of some sort. Such measuring mechanism may be a conventional one, or in the alternative, a creative one. The concept to be appreciated is that the first and second electrical output signals may be converted into a tangible form of measurements for a user to use. However, a measurement computer 90 may be used for calculating the thickness 42 of the workpiece 40 along the target axis 48.

Figure 3:
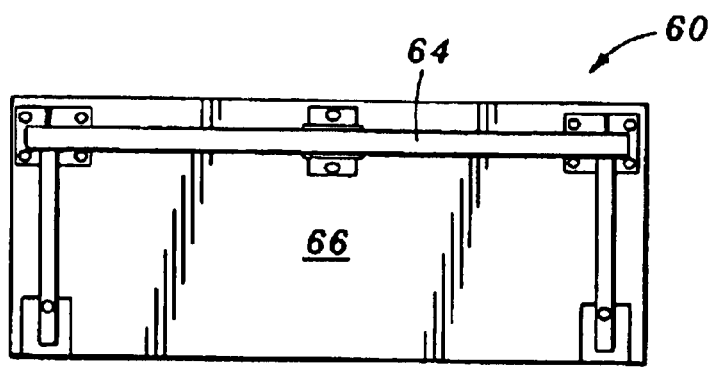
FIG. 3 is a plan view of a supporting structure for the laser non-contact thickness measurement system, further illustrating a gantry extending thereacross.
Figure 4:
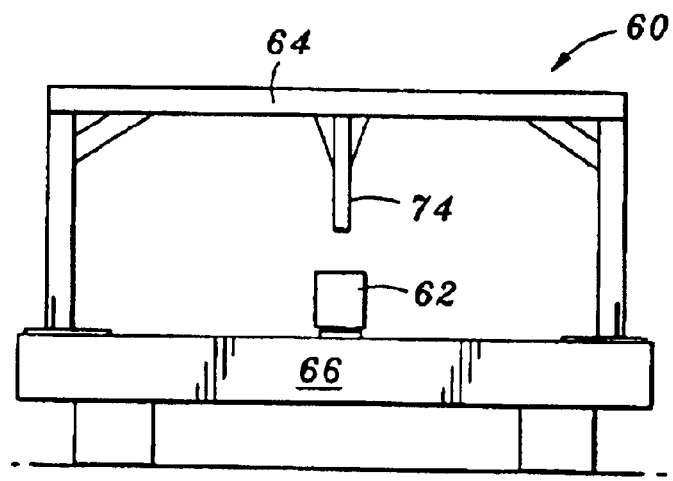
FIG. 4 is a front view of the supporting structure of FIG. 3 further defining a workpiece holder mounted thereon.
Figure 5:
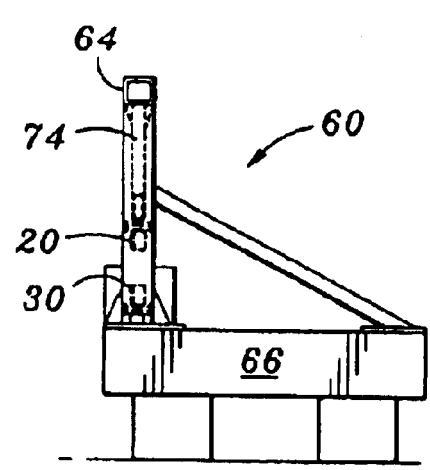
FIG. 5 is a side view of the supporting structure of FIG. 3 with the laser non-contact thickness measurement system of FIG. 1 attached thereto.

Referring now to FIGS. 3–5, a supporting fixture 60 may be utilized with the laser non-contact thickness measurement system 10 of the present invention. The supporting fixture 60 may comprise a surface plate 66. The surface plate 66 may be in any given size, but a 6 feet by 12 feet surface plate 66 may be preferred. Mounted on the surface plate 66, there may be a gantry 64 that may substantially extend thereacross. The gantry 64 may attach the first laser triangulation emitter/sensor 20 therefrom, whereas the second laser triangulation emitter/sensor may be on the surface plate 66.

Also mounted on the surface plate 66, preferably on the intermediate area thereof, there may exist a workpiece holder 62. The workpiece holder 62 should be positioned in a way that it is generally located below the first laser triangulation emitter/sensor 20 and above the second laser triangulation emitter/sensor 30. In this way, the workpiece 40 may be placed upon the workpiece holder 62 so that the workpiece 40 is positioned between the two generally opposing laser triangulation emitters/sensors 20, 30. Lastly, it should be contemplated that the supporting fixture 60, and its components as just described, may be fabricated from any applicable materials, such as metal, wood or the like.

The advantages produced by utilizing the present invention are believed to be significant. The laser non-contact thickness measurement system 10 is the recommended solution to the current methods of measuring the workpiece thicknesses 42 in the aerospace industry, such as the composite laminate skins. For instance, such system 10 may provide a very quick measurement (300 readings per second) with an increased accuracy (+/−0.0005 inches). Moreover, it does not require high operator skills, and rather may require low operator skills. The system 10 may also yield a Gage Repeatability and Reproducibility (R&R) of 6.97% (Green Rating) and further yield a large measurement area (about 4.5 feet wide×unlimited length).

In addition, the system 10 may also eliminate recurring calibration cost and further has excellent ability to collect variables data for SPC and Reduced Inspection. Furthermore, there may be a significant mitigation of degradation of System Performance During Trials. The laser non-contact thickness measurement system 10 of the present invention may evaluate broad ranges of materials with no change in calibration. More importantly, however, the time savings over the existing methods utilized in the aerospace industry is believed to be estimated at a minimum of 70%. There are further advantages yielded by the present invention, and the ones disclosed herein are just few of those advantages.

Additional modifications and improvements of the present invention may also be apparent to those of ordinary skill in the art. Thus, the particular combination of parts described and illustrated herein is intended to represent only certain embodiments of the present invention, and is not intended to serve as limitations of alternative devices within the spirit and scope of the invention.

What is claimed is:

1. A system for measuring a thickness of a workpiece having first and second sides, the second side defining a reference plane, the first side having a first angular orientation with respect to the reference plane, the reference plane further defining a target axis, the target axis extending perpendicular from a second side target point of the second side disposed in the reference plane through a first side target point of the first side, the system comprising:
   a) a first laser triangulation emitter/sensor sized and configured to emit a first laser beam at the first side target point, the first laser triangulation emitter/sensor being receivable of a first array of diffused laser beams reflecting from the first side target point;
   b) a first adjuster base engaged to the first laser triangulation emitter/sensor, the first adjuster base being operative to adjust the first laser triangulation emitter/sensor to emit the first laser beam in generally perpendicular relation to the first angular orientation of the first side;
   c) a first support column being pivotally engaged to the first adjuster base, the first adjuster base being pivotally movable with respect to the reference plane for facilitating adjustment of the first laser triangulation emitter/sensor;
   d) a first support base being removably engaged to the first support column, the first support column being vertically movable with respect to the reference plane for accommodating different thicknesses of the workpiece;
   e) a second laser triangulation emitter/sensor sized and configured to emit a second laser beam at the second side target point, the second laser triangulation emitter/sensor being receivable of a second array of diffused laser beams reflecting from the second side target point; and
   f) wherein the first and second array of diffused laser beams are respectively convertable into first and second signals for calculating the thickness of the workpiece along the target axis.

2. The system of claim 1 wherein the workpiece is a composite laminate skin.

3. The system of claim 1 wherein the first laser triangulation emitter/sensor comprises a first laser diode for emitting the first laser beam at the first side target point.

4. A The system of claim 1 wherein the second laser triangulation emitter/sensor comprises a second laser diode for emitting the second laser beam at the second side target point.

5. The system of claim 1 wherein the first laser triangulation emitter/sensor comprises a first lens and a first detector, the first array of diffused laser beams being reflectable from the first side target point to the first lens so as to focus upon the first detector therefrom.

6. The system of claim 5 wherein the first array of diffused laser beams comprises a brightest diffused laser beam disposed therein, the first detector being operative to selectively detect the brightest diffused laser beam, the first detector further being operative to generate the first signal in response to the detection of the brightest diffused laser beam.

7. The system of claim 1 further comprising a second adjuster base engaged to the second laser triangulation emitter/sensor, and wherein the second side defines a second angular orientation, the second adjuster base being operative to adjust the second laser triangulation emitter/sensor to emit the second laser beam in generally perpendicular relation to the second angular orientation.

8. The system of claim 7 wherein a second support column is pivotally engaged to the second adjuster base, the second adjuster base being pivotally movable with respect to the reference plane for facilitating adjustment of the second laser triangulation emitter/sensor.

9. The system of claim 8 wherein a second support base is removably engaged to the second support column, the second support column being vertically movable with respect to the reference plane for accommodating different thicknesses of the workpiece.

10. The system of claim 1 wherein the second laser triangulation emitter/sensor comprises a second lens and a second detector, the second diffused laser beams being reflectable from the second side target point to the second lens so as to focus upon the second detector therefrom.

11. The system of claim 10 wherein the second array of diffused laser beams comprises a brightest diffused laser beam disposed therein, the second detector being operative to selectively detect the brightest diffused laser beam, the second detector further being operative to generate the second signal in response to the detection of the brightest diffused laser beam.

12. The system of claim 1 wherein the first and second signals are respectively first and second electrical output signals, the first electrical output signal being representative of a first distance between the first laser triangulation emitter/sensor and the first side of the workpiece, the second electrical output signal being representative of a second distance between the second laser triangulation emitter/sensor and the second side of the workpiece.

13. The system of claim 12 wherein the first and second distances are respectively proportional to first and second angles, the first angle being indicative of a degree of separation between the emitted first laser beam and the reflected first array of diffused laser beams, the second angle being indicative of a degree of separation between the emitted second laser beam and the reflected second array of laser beams.

14. The system of claim 12 further comprising a measurement computer, and wherein the first and second electrical output signals are transmittable to the measurement computer for calculating the thickness of the workpiece along the target axis.

15. A method of measuring a thickness of a workpiece having first and second sides via a first laser triangulation emitter/sensor and a second laser triangulation emitter/sensor, the second side defining a reference plane, the first side having a first angular orientation with respect to the reference plane, the reference plane further defining a target axis, the target axis extending perpendicular from a second side target point of the second side disposed in the reference plane through a first side target point of the first side, the method comprising the steps of:

a) placing the workpiece between the first laser triangulation emitter/sensor and the second laser triangulation emitter/sensor;

b) adjusting a first adjuster base to aim the first laser triangulation emitter/sensor to emit a first laser beam in generally perpendicular relation to the first angular orientation of the first side, the first adjuster base being engaged to the first laser triangulation emitter/sensor; the adjusting comprising:

i) pivotally moving the first adjuster base with respect to the plane of reference for facilitating adjustment of the first laser triangulation emitter/sensor, the first adjuster base being pivotally engaged to a first support column; and ii) vertically moving the first support column with respect to the reference plane for accommodating different thicknesses of the workpiece, a first support base being removably engaged to the first support column;

c) emitting the first laser beam from the first laser triangulation emitter/sensor at the first side target point;

d) receiving a first array of diffused laser beams reflected from the first side target point with the first laser triangulation emitter/sensor;

e) emitting a second laser beam from the second laser triangulation emitter/sensor at the second side target point;

f) receiving a second array of diffused laser beams reflected from the second side target point with the second laser triangulation emitter/sensor; and g) converting the first and second array of diffused laser beams into respective first and second signals for calculating the thickness of the workpiece along the target axis.

16. The method of claim 15 wherein the workpiece is a composite laminate skin.

17. The method of claim 15 wherein step c) comprises:

a) defining a first laser diode of the first laser triangulation emitter/sensor; and b) emitting the first laser beam from the first laser diode at the first side target point.

18. The method of claim 15 wherein step e) comprises:

a) defining a second laser diode of the second laser triangulation emitter/sensor; and b) emitting the second laser beam from the second laser diode at the second side target point.

19. The method of claim 15 wherein step d) comprises:

a) defining a first lens and a first detector of the first laser triangulation emitter/sensor;

b) receiving the reflected first array of diffused laser beams with the first lens; and c) receiving the first array of diffused laser beams from the first lens with the first detector.

20. The method of claim 19 wherein step c) comprises:

a) detecting a brightest diffused laser beam disposed in the first array of diffused laser beams; and b) generating the first signal in response to the detection of the brightest diffused laser beam.

21. The method of claim 15 wherein prior to step e) the method comprises the steps of:

a) defining a second angular orientation of the second side; and b) adjusting a second adjuster base to aim the second laser triangulation emitter/sensor to emit the second laser beam in generally perpendicular relation to the second angular orientation, the second adjuster base being engaged to the second laser triangulation emitter/sensor.

22. The method of claim 21 wherein step b) comprises:

a) defining a second support column pivotally engaged to the second adjuster; and b) pivotally moving the second adjuster base with respect to the reference plane for facilitating adjustment of the second laser triangulation emitter/sensor.

23. The method of claim 22 wherein step a) comprises:
a) defining a second support base removably engaged to the second support column; and
b) vertically moving the second support column with respect to the reference plane for accommodating different thicknesses of the workpiece.

24. The method of claim 15 wherein step f) comprises:
a) defining a second lens and a second detector of the second laser triangulation emitter/sensor;
b) receiving the reflected second array of diffused laser beams with the second lens; and
c) receiving the second array of diffused laser beams from the second lens with the second detector.

25. The method of claim 24 wherein step c) comprises:
a) detecting a brightest diffused laser beam disposed in the second array of diffused laser beams; and
b) generating the second signal in response to the detection of the brightest diffused laser beam.

26. The method of claim 15 wherein the first and second signals in step g) are respectively first and second electrical output signals, the first electrical output signal being representative of a first distance between the first laser triangulation emitter/sensor and the first side of the workpiece, the second electrical output signal being representative of a second distance between the second laser triangulation emitter/sensor and the second side of the workpiece.

27. The method of claim 26 wherein the first and second distances are respectively proportional to first and second angles, the first angle being indicative of a degree of separation between the emitted first laser beam and the reflected first array of diffused laser beams, the second angle being indicative of a degree of separation between the emitted second laser beam and the reflected second array of diffused laser beams.

28. The method of claim 26 wherein step g) comprises:
a) transmitting the first and second electrical output signals to a measurement computer; and
b) using the transmitted first and second electrical output signals to calculate the thickness of the workpiece along the target axis.

29. A method of measuring a thickness of a workpiece having first and second sides via first and second laser triangulation emitters/sensors, the second side defining a reference plane, the first and second sides respectively defining a plurality of corresponding first and second side target points, each of the corresponding first and second side target points defining a target axis which extends perpendicular therebetween, the method comprising the steps of:
a) placing the workpiece between the first and second laser triangulation emitters/sensors;
b) emitting a first laser beam from the first laser triangulation emitter/sensor at one of the first side target points of the first side to receive a first array of diffused laser beams reflected therefrom;
c) emitting a second laser beam from the second laser triangulation emitter/sensor at the corresponding second side target point of the second side to receive a second array of diffused laser beams reflected therefrom; and
d) maneuvering the workpiece between the first and second laser triangulation emitters/sensors in x, y, z and Θ axes with respect to the reference plane, the first and second laser triangulation emitters/sensors being operative to continuously emit the first and second laser beams at any of the plurality of corresponding first and second side target points to receive the respective first and second array of diffused laser beams therefrom for measuring the thickness of the workpiece along each of the target axes defined thereby.

30. The method of claim 29 further comprising the step of:
a) continuously converting the first and second array of diffused laser beams into respective first and second electrical output signals as the workpiece maneuvers between the first and second laser triangulation emitters/sensors;
b) transmitting the first and second electrical output signals to a measurement computer; and
c) using the transmitted first and second electrical output signals to calculate the thickness of the workpiece along the respective target axes.

31. The method of claim 29 wherein step d) comprises:
a) defining peripheral edges of the workpiece; and
b) maneuvering the workpiece such that none of the emitted first and second laser beams extend beyond the peripheral edges of the workpiece.

32. The method of claim 29 wherein step d) comprises:
a) moving the workpiece laterally with respect to the reference plane along an x axis;
b) moving the workpiece longitudinally with respect to the reference plane along a y axis;
c) moving the workpiece vertically with respect to the reference plane along a z axis; and
d) moving the workpiece in a rotational motion with respect to the reference plane along a Θ axis.

33. The method of claim 29 wherein step d) comprises:
a) defining a configuration of the workpiece; and
b) measuring the thickness of the configuration via emitting the first and second laser beams thereto when the workpiece is maneuvered between the first and second laser triangulation emitters/sensors.

34. The method of claim 29 wherein the configuration of the workpiece is a pyramidal configuration, the pyramidal configuration being defined in an intermediate area of the workpiece.

35. The method of claim 29 wherein the workpiece is a composite laminate skin.

36. A system for measuring a thickness of a workpiece having first and second sides, the second side defining a reference plane, the first side having a first angular orientation with respect to the reference plane, the reference plane further defining a target axis, the target axis extending perpendicular from a second side target point of the second side disposed in the reference plane through a first side target point of the first side, the system comprising:
a) a first laser triangulation emitter/sensor sized and configured to emit a first laser beam at the first side target point, the first laser triangulation emitter/sensor being receivable of a first array of diffused laser beams reflecting from the first side target point;
b) a first adjuster base engaged to the first laser triangulation emitter/sensor, the first adjuster base being operative to adjust the first laser triangulation emitter/sensor to emit the first laser beam in generally perpendicular relation to the first angular orientation of the first side;
c) a second laser triangulation emitter/sensor sized and configured to emit a second laser beam at the second side target point, the second laser triangulation emitter/sensor being receivable of a second array of diffused laser beams reflecting from the second side target point;

d) wherein the first and second array of diffused laser beams are respectively convertable into first and second signals for calculating the thickness of the workpiece along the target axis;

e) a second adjuster base engaged to the second laser triangulation emitter/sensor, and wherein the second side defines a second angular orientation, the second adjuster base being operative to adjust the second laser triangulation emitter/sensor to emit the second laser beam in generally perpendicular relation to the second angular orientation;

f) a second support column pivotally engaged to the second adjuster base, the second adjuster base being pivotally movable with respect to the reference plane for facilitating adjustment of the second laser triangulation emitter/sensor; and g) a second support base removably engaged to the second support column, the second support column being vertically movable with respect to the reference plane for accommodating different thicknesses of the workpiece.

37. The system of claim 36 wherein the second laser triangulation emitter/sensor comprises a second laser diode for emitting the second laser beam at the second side target point.

38. The system of claim 36 wherein the second laser triangulation emitter/sensor comprises a second lens and a second detector, the second diffused laser beams being reflectable from the second side target point to the second lens so as to focus upon the second detector therefrom.

39. The system of claim 38 wherein the second array of diffused laser beams comprises a brightest diffused laser beam disposed therein, the second detector being operative to selectively detect the brightest diffused laser beam, the second detector further being operative to generate the second signal in response to the detection of the brightest diffused laser beam.

40. A method of measuring a thickness of a workpiece having first and second sides via a first laser triangulation emitter/sensor and a second laser triangulation emitter/sensor, the second side defining a reference plane, the first side having a first angular orientation with respect to the reference plane, the reference plane further defining a target axis, the target axis extending perpendicular from a second side target point of the second side disposed in the reference plane through a first side target point of the first side, the method comprising the steps of:

a) placing the workpiece between the first laser triangulation emitter/sensor and the second laser triangulation emitter/sensor;

b) adjusting a first adjuster base to aim the first laser triangulation emitter/sensor to emit a first laser beam in generally perpendicular relation to the first angular orientation of the first side, the first adjuster base being engaged to the first laser triangulation emitter/sensor;

c) emitting the first laser beam from the first laser triangulation emitter/sensor at the first side target point;

d) receiving a first array of diffused laser beams reflected from the first side target point with the first laser triangulation emitter/sensor;

e) adjusting a second adjuster base to aim the second laser triangulation emitter/sensor to emit a second laser beam in generally perpendicular relation to the second angular orientation of the second side, the second adjuster base being engaged to the second laser triangulation emitter/sensor;

f) pivotally moving the second adjuster base with respect to the plane of reference for facilitating adjustment of the second laser triangulation emitter sensor, the second adjuster base being pivotally engaged to a second support column;

g) vertically moving the second support column with respect to the reference plane for accommodating different thicknesses of the workpiece, a second support base being removably engaged to the second support column, the second support base being engaged opposite the second adjuster base to position the second support column therebetween;

h) emitting a second laser beam from the second laser triangulation emitter/sensor at the second side target point;

i) receiving a second array of diffused laser beams reflected from the second side target point with the second laser triangulation emitter/sensor; and j) converting the first and second array of diffused laser beams into respective first and second signals for calculating the thickness of the workpiece along the target axis.

41. The method of claim 40 wherein step h) comprises:

a) defining a second laser diode of the second laser triangulation emitter/sensor; and b) emitting the second laser beam from the second laser diode at the second side target point.

42. The method of claim 40 wherein step i) comprises:

a) defining a second lens and a second detector of the second laser triangulation emitter/sensor;

b) receiving the reflected second array of diffused laser beams with the second lens; and c) receiving the second array of diffused laser beams from the second lens with the second detector.

43. The method of claim 42 wherein step c) comprises:

a) detecting a brightest diffused laser beam disposed in the second array of diffused laser beams; and b) generating the second signal in response to the detection of the brightest diffused laser beam.

44. A system for measuring a thickness of a workpiece having first and second sides, the second side defining a reference plane, the first side having a first angular orientation with respect to the reference plane, the reference plane further defining a target axis, the target axis extending perpendicular from a second side target point of the second side disposed in the reference plane through a first side target point of the first side, the system comprising:

a) a first laser triangulation emitter/sensor sized and configured to emit a first laser beam at the first side target point, the first laser triangulation emitter/sensor being receivable of a first array of diffused laser beams reflecting from the first side target point;

b) a first support system being removably engaged to the first laser triangulation emitter/sensor, the first support system being operative to vertically move the first laser triangulation emitter/sensor with respect to the reference plane for accommodating different thicknesses of the workpiece, wherein the first support system comprises:

i) a first adjuster base engaged to the first laser triangulation emitter/sensor, the first adjuster base being operative to adjust the first laser triangulation emitter/sensor to emit the first laser beam in generally perpendicular relation to the first annular orientation of the first side;

ii) a first support column being pivotally engaged to the first adjuster base, the first adjuster base being pivotally movable with respect to the reference plane for facilitating adjustment of the first laser triangulation emitter/sensor; and iii) a first support base being removably engaged to the first support column, the first support column being vertically movable with respect to the reference plane;

c) a second laser triangulation emitter/sensor sized and configured to emit a second laser beam at the second side target point, the second laser triangulation emitter/sensor being receivable of a second array of diffused laser beams reflecting from the second side target point; and d) wherein the first and second array of diffused laser beams are respectively convertible into first and second signals for calculating the thickness of the workpiece along the target axis.

45. The system of claim 44 further comprising a second adjuster base engaged to the second laser triangulation emitter/sensor, and wherein the second side defines a second angular orientation, the second adjuster base being operative to adjust the second laser triangulation emitter/sensor to emit the second laser beam in generally perpendicular relation to the second angular orientation.

46. The system of claim 45 wherein a second support column is pivotally engaged to the second adjuster base, the second adjuster base being pivotally movable with respect to the reference plane for facilitating adjustment of the second laser triangulation emitter/sensor.

47. The system of claim 46 wherein a second support base is removably engaged to the second support column, the second support column being vertically movable with respect to the reference plane for accommodating different thicknesses of the workpiece.

48. The system of claim 44 wherein the first and second signals are respectively first and second electrical output signals, the first electrical output signal being representative of a first distance between the first laser triangulation emitter/sensor and the first side of the workpiece, the second electrical output signal being representative of a second distance between the second laser triangulation emitter/sensor and the second side of the workpiece.

* * * * *